United States Patent
Han et al.

(10) Patent No.: US 10,735,778 B2
(45) Date of Patent: Aug. 4, 2020

(54) PROXY ASSISTED PANORAMIC VIDEO STREAMING AT MOBILE EDGE

(71) Applicant: AT&T Intellectual Property I, L.P., Atlanta, GA (US)

(72) Inventors: Bo Han, Bridgewater, NJ (US); Vijay Gopalakrishnan, Edison, NJ (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/109,892

(22) Filed: Aug. 23, 2018

(65) Prior Publication Data

US 2020/0068235 A1 Feb. 27, 2020

(51) Int. Cl.
*H04N 21/231* (2011.01)
*H04N 21/222* (2011.01)
(Continued)

(52) U.S. Cl.
CPC . *H04N 21/23106* (2013.01); *H04N 21/21805* (2013.01); *H04N 21/222* (2013.01);
(Continued)

(58) Field of Classification Search
CPC ........... H04N 21/23106; H04N 21/222; H04N 21/234; H04N 21/25866; H04N 21/21805; H04N 21/41407
See application file for complete search history.

(56) References Cited

U.S. PATENT DOCUMENTS 9,356,985 B2  5/2016  Burckart et al.
9,648,394 B2  5/2017  Xu et al.
(Continued)

FOREIGN PATENT DOCUMENTS

GB  2538531 A  11/2016
GB  2552943 A  2/2018
(Continued)

OTHER PUBLICATIONS

Chen, Min et al., Data-driven computing and caching in 5G networks: Architecture and delay analysis; IEEE Wireless Communications 25.1 (2018): 70-75.
(Continued)

*Primary Examiner* — Yassin Alata
(74) *Attorney, Agent, or Firm* — Guntin & Gust, PLC; Jay Anderson

(57) ABSTRACT

Aspects of the subject disclosure may include, for example, system for tile-based video streaming using a proxy executing at a mobile edge cloud, which adaptively offloads decoding and merging of video tiles from mobile devices to the mobile edge cloud. A processing system including the proxy communicates with a video server and a client device. The proxy receives a request for video content from a client device; the request includes historical field of view (FoV) information. The proxy predicts a client FoV, requests video tiles from the server, downloads the tiles from the server, generates a video chunk by decoding and merging the downloaded tiles, and delivers the video chunk to the client device. The client device performs local decoding and rendering of the generated video chunk. Other embodiments are disclosed.

20 Claims, 13 Drawing Sheets

(51) Int. Cl.
*H04N 21/234* (2011.01)
*H04N 21/258* (2011.01)
*H04N 21/218* (2011.01)
*H04N 21/414* (2011.01)

(52) U.S. Cl.
CPC ..... *H04N 21/234* (2013.01); *H04N 21/25866* (2013.01); *H04N 21/41407* (2013.01)

(56) References Cited

U.S. PATENT DOCUMENTS

| | | |
|---|---|---|
| 9,767,363 B2 | 9/2017 | Birkbeck et al. |
| 9,912,717 B2 | 3/2018 | Ha et al. |
| 9,917,877 B2 | 3/2018 | Adams et al. |
| 9,930,225 B2 | 3/2018 | Villmer |
| 9,955,194 B2 | 4/2018 | Wolman et al. |
| 9,986,221 B2 | 5/2018 | Zhou |
| 2013/0185353 A1 | 7/2013 | Rondao Alface et al. |
| 2016/0198140 A1 | 7/2016 | Nadler |
| 2017/0048876 A1 | 2/2017 | Mahindra et al. |
| 2017/0230482 A1 | 8/2017 | Ranjan et al. |
| 2017/0236252 A1 | 8/2017 | Nguyen et al. |
| 2017/0237983 A1 | 8/2017 | Adsumilli et al. |
| 2017/0302714 A1 | 10/2017 | Ramsay et al. |
| 2017/0330365 A1 | 11/2017 | Adamov et al. |
| 2017/0330382 A1 | 11/2017 | Adamov et al. |
| 2018/0146041 A1 | 5/2018 | Moustafa et al. |
| 2018/0146198 A1 | 5/2018 | Atluru et al. |
| 2018/0167613 A1 | 6/2018 | Hannuksela et al. |
| 2018/0167634 A1 | 6/2018 | Salmimaa et al. |
| 2019/0089643 A1* | 3/2019 | Westphal ............. H04N 21/238 |

FOREIGN PATENT DOCUMENTS

| | | |
|---|---|---|
| GB | 2552944 A | 2/2018 |
| GB | 2557416 | 6/2018 |
| WO | 2017140946 A1 | 8/2017 |
| WO | 2017162912 A1 | 9/2017 |
| WO | 2018075090 A1 | 4/2018 |

OTHER PUBLICATIONS

Choy, Sharon et al., A hybrid edge-cloud architecture for reducing on-demand gaming latency; Multimedia Systems 20.5 (2014): 503-519, pp. 1-17.

Choy, Sharon, Edgecloud: A new hybrid platform for on-demand gaming, Technical Report CS-2012-19, University of Waterloo (2012) pp. 1-14.

Engebretson, Joan, AT&T Virtual and Augmented Reality Project Taps Edge Computing, tele competitor, telecompetitor.com, Feb. 20, 2018, pp. 1-2.

Liu, Xing et al., "360 Innovations for Panoramic Video Streaming", Proceedings of the 16th ACM Workshop on Hot Topics in Networks, ACM, 2017, pp. 1-7.

Mangiante, Simone et al., VR is on the Edge: How to Deliver 360 degrees Videos in Mobile Networks; Conference: the Workshop, researchgate.net, DOI: 10.1145/3097895.3097901, (Aug. 2017), pp. 1-18.

Mohapatra, Shivajit et al., Integrated power management for video streaming to mobile handheld devices; Proceedings of the eleventh ACM international conference on Multimedia, ACM, 2003, pp. 1-16.

Westphal, Cedric, Challenges in networking to support augmented reality and virtual reality; Int. Conf. on Computing, Networking and Communications (ICNC 2017), 2017, pp. 1-5.

* cited by examiner

US 10,735,778 B2

PROXY ASSISTED PANORAMIC VIDEO STREAMING AT MOBILE EDGE

FIELD OF THE DISCLOSURE

The subject disclosure relates to panoramic video presentations including up to 360-degree video presentations (also called immersive video or spherical video), and more particularly to a system for delivering an immersive viewing experience to a user device via a proxy executing on a mobile edge cloud.

BACKGROUND

Panoramic videos, including 360° videos also known as immersive or spherical videos, play a critical role in users' Virtual Reality experiences. Users can consume panoramic videos on mobile devices combined with affordable head-mounted displays.

In a segment-based video streaming scheme, segments of the presentation overlapping with a user's predicted Field of View (FoV) are delivered to the user device. Multiple video segments need to be decoded simultaneously in order to re-construct the corresponding FoV. For mobile devices having a limited number of video decoders, processing segments of panoramic videos can lead to unacceptable stall time and high energy consumption, which affects the quality of user experience.

BRIEF DESCRIPTION OF THE DRAWINGS

Reference will now be made to the accompanying drawings, which are not necessarily drawn to scale, and wherein.

DETAILED DESCRIPTION

Figure 1:
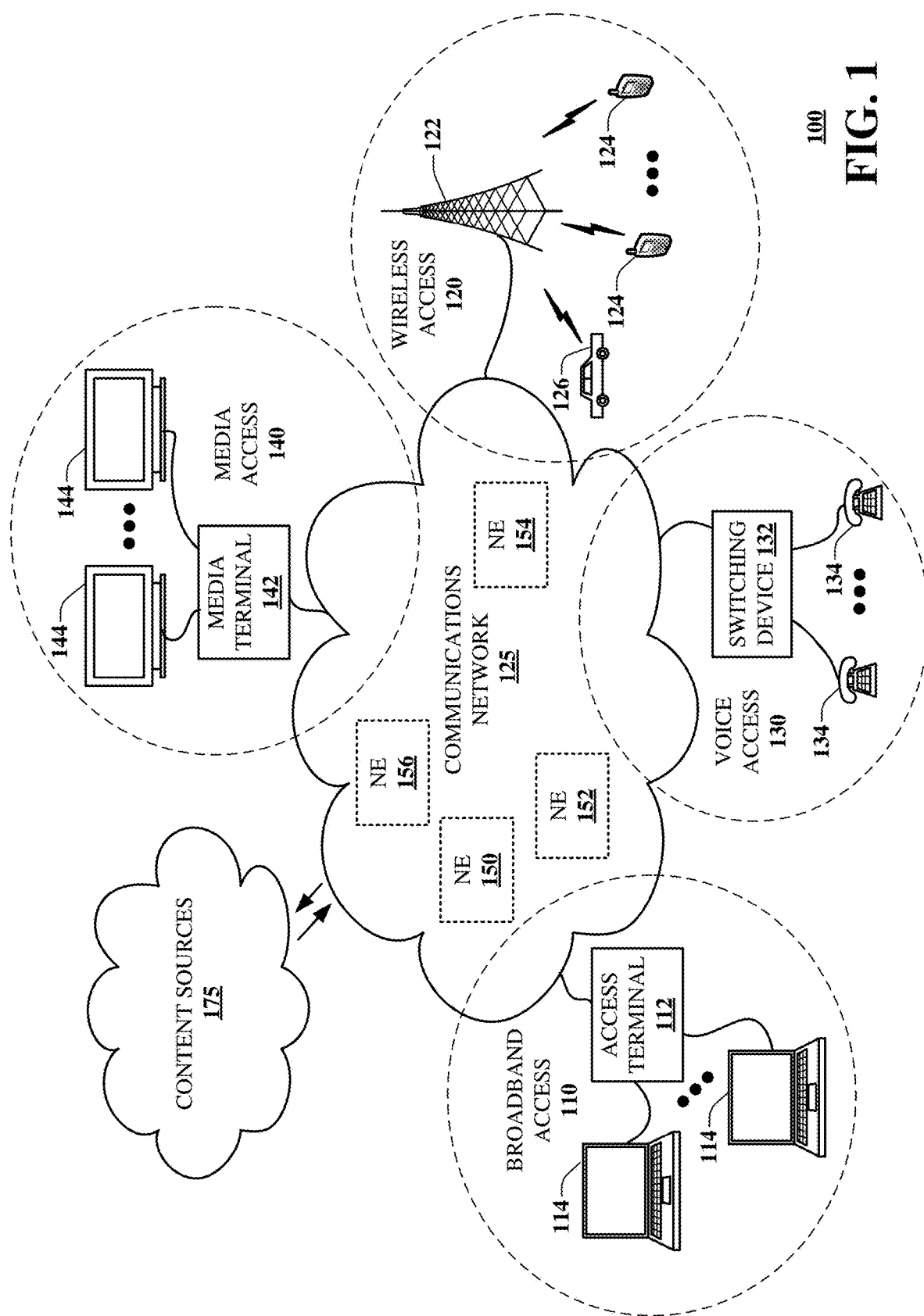
FIG. 1 is a block diagram illustrating an example, non-limiting embodiment of a communications network in accordance with various aspects described herein.

The subject disclosure describes, among other things, illustrative embodiments for tile-based video streaming in which decoding and merging video tiles is performed by a proxy executing at a mobile edge cloud. Other embodiments are described in the subject disclosure.

One or more aspects of the subject disclosure include a method comprising receiving, by a processing system including a processor, a request for video content from a client device; the processing system comprises a proxy executing via cloud computing (for example, at a cloud edge) and communicating the video content comprising an immersive video presentation. The video presentation includes a plurality of chunks corresponding to spatial subdivisions of the video presentation, each chunk of the plurality of chunks comprising a plurality of tiles corresponding to spatial subdivisions of the chunk and a plurality of frames corresponding to temporal subdivisions of the chunk; the request also comprises historical field of view (FoV) information. The method also comprises predicting a FoV corresponding to the request; estimating a throughput rate for data transmission between the processing system and the client device; and determining whether a chunk stored in a first cache accessible to the processing system meets a first criterion and a second criterion. A chunk meeting the first criterion has a viewport overlapping the predicted FoV for each frame of the chunk with a level of overlap satisfying a predetermined first threshold; a chunk meeting the second criterion has an encoding quality satisfying a second threshold based on the estimated throughput rate. The method further comprises transmitting a chunk meeting the first criterion and the second criterion to the client device.

The method also comprises, responsive to the chunk stored in the first cache not meeting the first criterion and the second criterion, requesting a plurality of tiles from a video server. The method further comprises downloading the plurality of tiles from the video server, where each of the plurality of tiles meets the first criterion and the second criterion and has an encoding bit rate. The method further comprises generating a video chunk by decoding and merging the plurality of tiles downloaded from the video server; storing the generated video chunk in the first cache; storing the plurality of tiles obtained from the video server in a second cache; and delivering the generated video chunk to the client device. The client device performs local decoding and rendering of the generated video chunk, a total time required for the downloading, generating, delivering, local decoding and rendering meets a third criterion.

One or more aspects of the subject disclosure include a device comprising a processing system including a processor, and a memory that stores executable instructions that, when executed by the processing system, facilitate performance of operations. The operations comprise receiving a request for video content from a client device, the request comprises historical field of view (FoV) information. The processing system comprises a proxy executing via cloud computing and communicating the video content comprising an immersive video presentation, and the video presentation includes a plurality of chunks, each chunk of the plurality of chunks comprising a plurality of tiles and a plurality of frames. The operations further comprise predicting a FoV corresponding to the request; estimating a throughput rate for data transmission between the processing system and the client device; and determining whether a chunk stored in a first cache accessible to the processing system meets a first criterion and a second criterion. A chunk meeting the first criterion has a viewport overlapping the predicted FoV for each frame of the chunk with a level of overlap satisfying a predetermined first threshold; a chunk meeting the second criterion has an encoding quality satisfying a second threshold based on the estimated throughput rate. The operations further comprise transmitting a chunk meeting the first criterion and the second criterion to the client device.

The operations also comprise, responsive to the chunk stored in the first cache not meeting the first criterion and the second criterion, requesting a plurality of tiles from a video server. The operations further comprise downloading the plurality of tiles from the video server, where each of the plurality of tiles meets the first criterion and the second criterion and has an encoding bit rate. The operations further comprise generating a video chunk by decoding and merging the plurality of tiles downloaded from the video server; storing the generated video chunk in the first cache; storing the plurality of tiles obtained from the video server in a second cache; and delivering the generated video chunk to the client device.

One or more aspects of the subject disclosure include a machine-readable medium comprising executable instructions that, when executed by a processing system including a processor, facilitate performance of operations. The operations comprise receiving a request for video content from a client device; the processing system comprises a proxy executing via cloud computing, the video content comprises a plurality of chunks, each chunk of the plurality of chunks comprising a plurality of tiles and a plurality of frames, and the request comprises historical field of view (FoV) information. The operations further comprise predicting a FoV corresponding to the request; estimating a throughput rate for data transmission between the processing system and the client device; and determining whether a chunk stored in a first memory meets a plurality of conditions. The conditions include having a viewport overlapping the predicted FoV for each frame of the chunk with a level of overlap satisfying a predetermined first threshold, and having an encoding quality satisfying a second threshold based on the estimated throughput rate. The operations further comprise transmitting a chunk meeting the conditions to the client device.

The operations also comprise requesting a plurality of tiles from a video server if the chunk stored in the first memory does not meet the conditions. The operations further comprise downloading the plurality of tiles from the video server, where each of the plurality of tiles meets the conditions. The operations further comprise generating a video chunk by decoding and merging the plurality of tiles downloaded from the video server; storing the generated video chunk in the first memory; storing the plurality of tiles obtained from the video server in a second memory; and delivering the generated video chunk to the client device.

Referring now to FIG. 1, a block diagram is shown illustrating an example, non-limiting embodiment of a communications network 100 in accordance with various aspects described herein. For example, communications network 100 can facilitate in whole or in part fulfilling requests from client devices for video content by sending video tiles obtained from a video content server to an edge cloud processor on which a mobile edge proxy executes; the mobile edge proxy communicates with the client devices via a portion of network 100. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
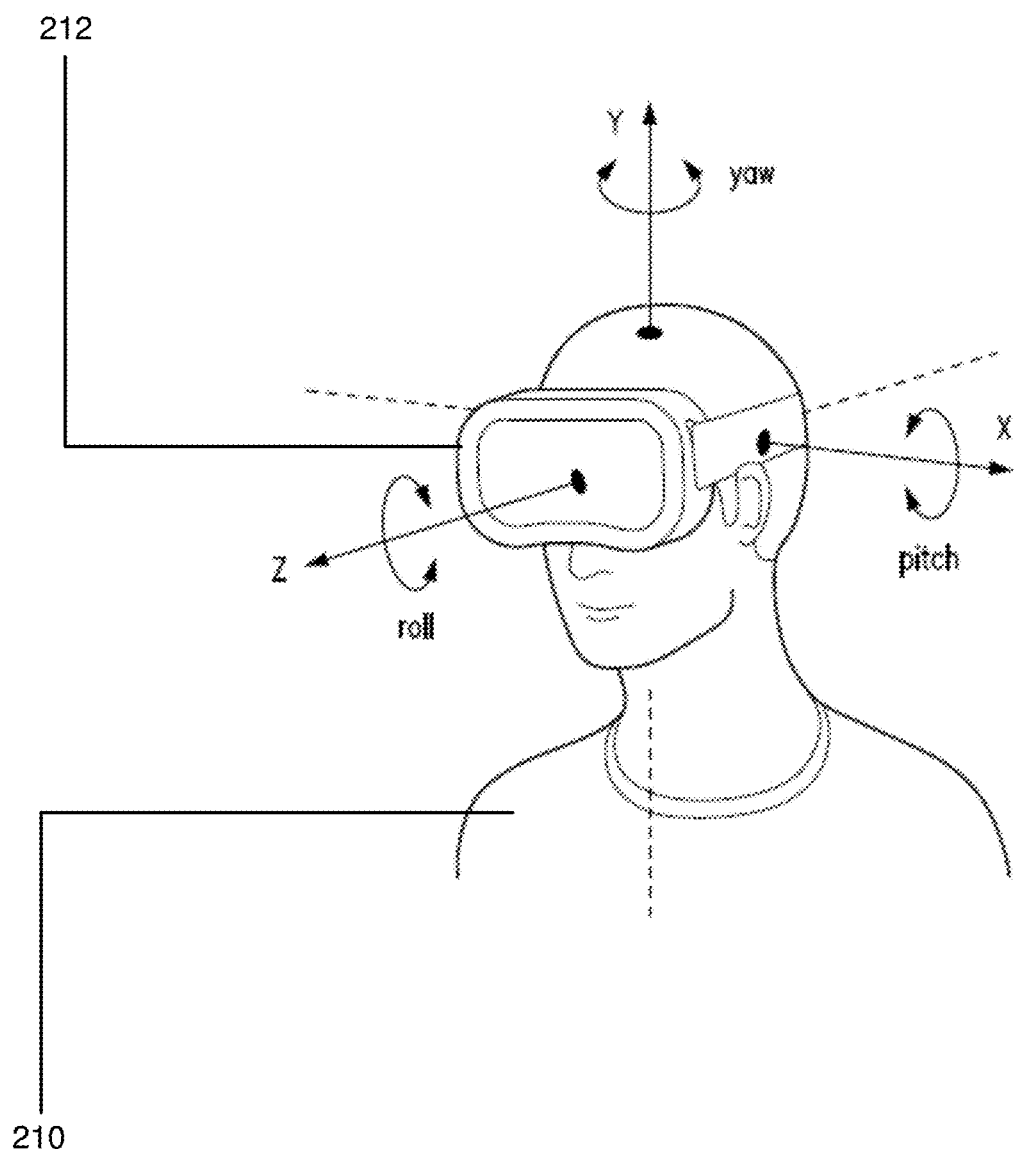
FIG. 2A schematically illustrates a non-limiting embodiment of a system functioning within the communication network of FIG. 1, in which a virtual reality (VR) headset delivers a 360° video presentation to a user, in accordance with various aspects described herein.
Figure 2B:
FIG. 2B illustrates an example of a 360° video image that may be delivered to a user via the system of FIG. 2A.

FIG. 2A schematically illustrates a non-limiting embodiment of a system 201 functioning within the communication network of FIG. 1, in which a virtual reality (VR) headset delivers a 360° video presentation to a user, in accordance with various aspects described herein. FIG. 2B illustrates a 360° video image 215 that may be delivered to the user via system 201.

In this embodiment, the VR headset is coupled to a communication device (not shown in FIG. 2A) that communicates with a video server via network 100. The VR headset can be connected to the communication device by a wired or wireless connection; the VR headset and the communication device can also form an integrated device. In the embodiments described herein, it is understood that the term "client device" refers to a device that presents image data to a user of the device; the client device can include a VR headset.

As shown in FIG. 2A, when watching a 360 degree video, a viewer 210 is supposed to be at the spherical center and can freely control her or his viewing directions. Therefore, each playback creates a unique user experience. The viewer 210 wearing a VR headset 212 can adjust her or his orientation by changing the pitch, yaw, and roll, which correspond to rotating along the X, Y, and Z axes, respectively. The 360 degree video player (e.g., of the VR headset 212) computes and displays the viewing area based on the orientation and the Field of View (FoV). The FoV defines the extent of the observable area, which is usually a fixed parameter of a VR headset (e.g., 110° horizontally and 90° vertically).

Figure 2C:
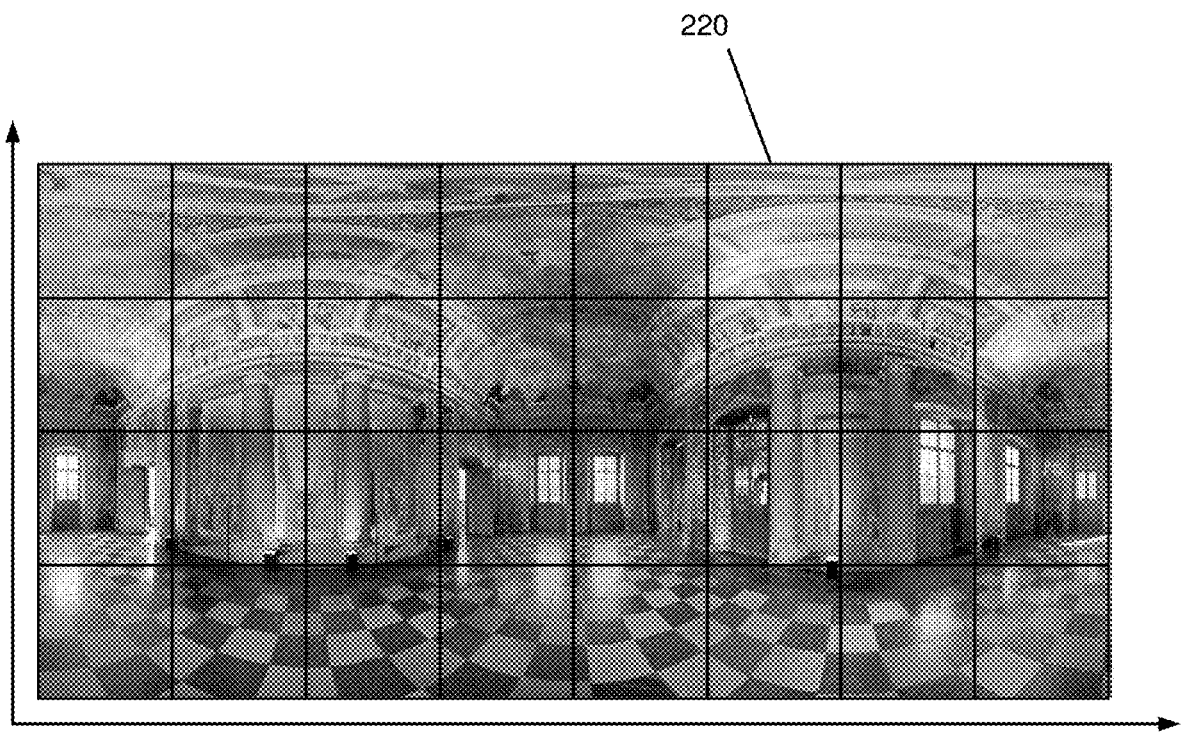
FIG. 2C schematically illustrates spatial segmentation of a video chunk of a 360° video presentation, in accordance with various aspects described herein.

In tile-based video streaming according to the present disclosure, each chunk of a panoramic video is spatially segmented into multiple smaller chunks, referred to herein as tiles. Tiles are provided by a video server and delivered to the client device for presentation to the user, based on their degree of overlap with the user's predicted FoV. In various embodiments, tiles overlapping the FoV are delivered at high quality while tiles outside the FoV are delivered at lower quality or perhaps not at all. FIG. 2C schematically illustrates spatial segmentation 203 of a video chunk 220 of a panoramic video presentation, in accordance with various aspects described herein. As shown in FIG. 2C, chunk 220 is segmented into tiles each covering a subarea of the chunk.

Figure 2D:
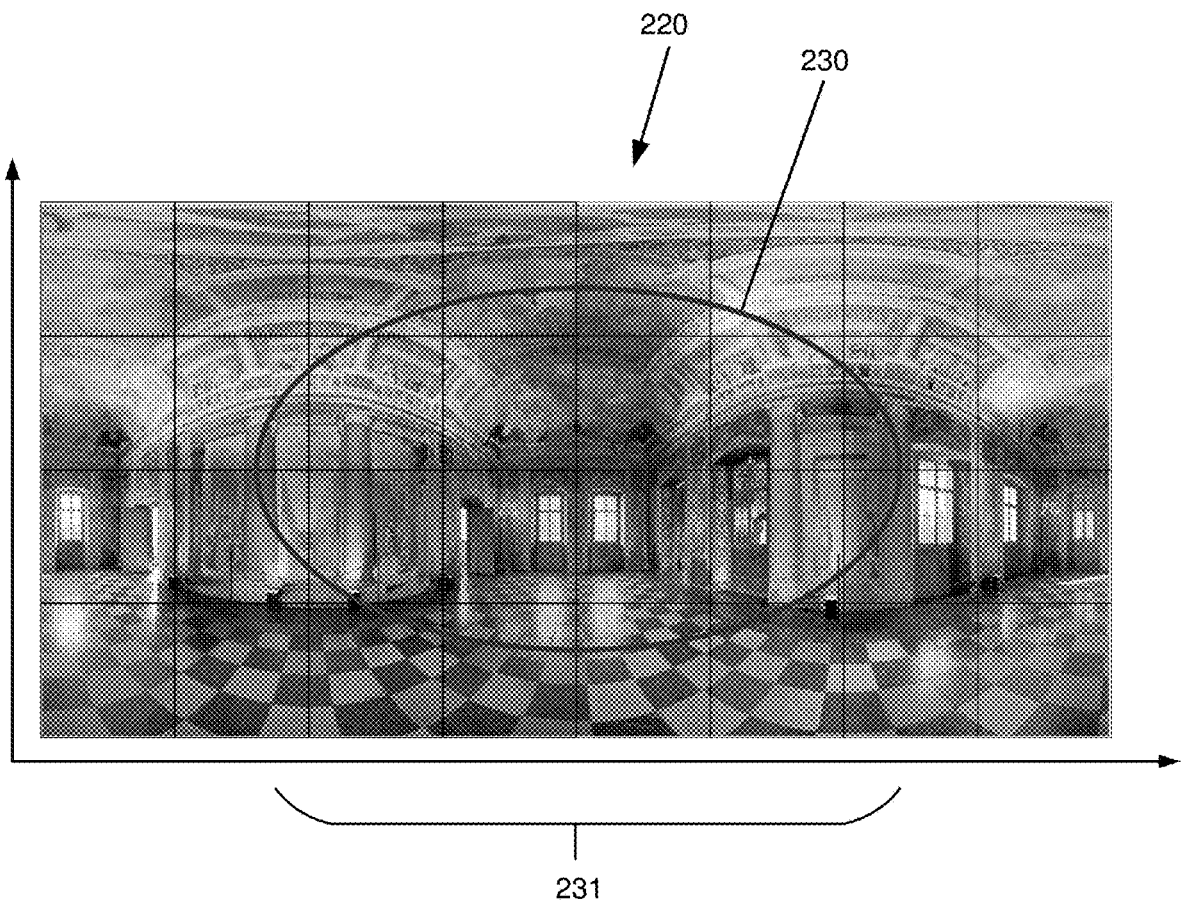
FIG. 2D schematically illustrates tiles of a video chunk within a field of view (FoV) of a user and outside the FoV, in accordance with various aspects described herein.

FIG. 2D is a schematic illustration 204 of the tiles in chunk 220 of a panoramic video, where the user's FoV or predicted FoV 230 corresponds to a portion of the chunk, in accordance with an embodiment 203 of the disclosure. As shown in FIG. 2D, the user's FoV overlaps with a portion 231 of the chunk containing a subset of the tiles. (Portion 231 may be referred to herein as the viewport.) In an embodiment, the client device requests tiles corresponding to the viewport for presentation to the user. If a VR headset is used in the client device, the user's head movement can be analyzed to predict the FoV, and tiles corresponding to the predicted viewport are requested.

In general, a given tile of chunk 220 will have a degree of overlap with the predicted FoV varying between 0% and 100%. In this embodiment, all tiles that fully or partially overlap the FoV are included in the viewport. In another embodiment, a tile may be included in the viewport if at least a predetermined portion of its area (e.g. 5% or more) overlaps the FoV.

Figure 2E:
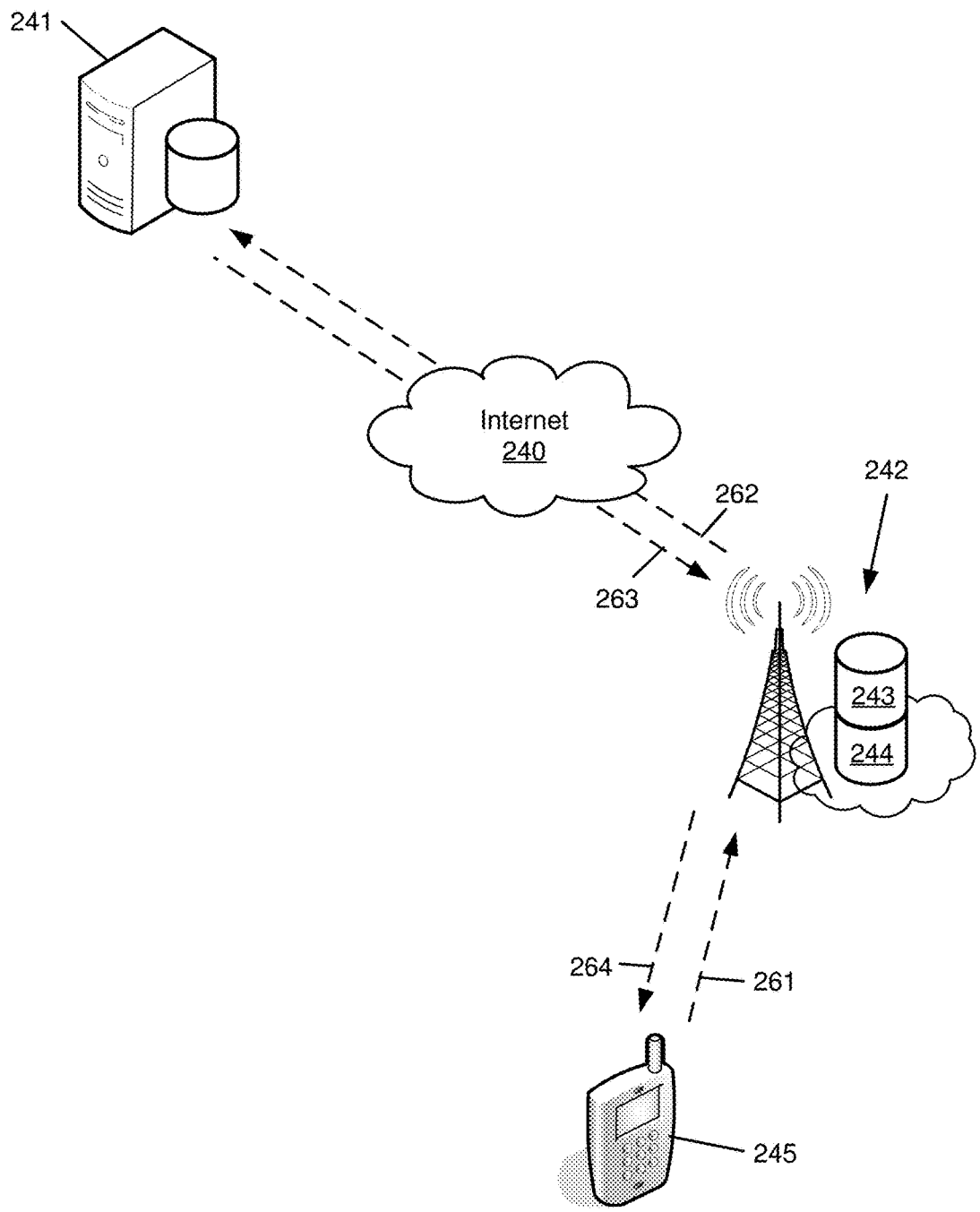
FIG. 2E schematically illustrates a non-limiting embodiment of a system functioning within the communication network of FIG. 1, showing communication between a mobile client device, a proxy at a mobile edge cloud, and a video server providing a 360° video presentation, in accordance with various aspects described herein.

FIG. 2E schematically illustrates a non-limiting embodiment of a system 205 functioning within the communication network of FIG. 1, in which a mobile edge proxy communicates with a client device and with a video server to provide tile-based video streaming to the client device. In this embodiment, the term "mobile edge proxy" refers to a proxy executing on a processing system, located at a cloud edge, that communicates with mobile client devices (e.g. over a cellular network). As shown in FIG. 2E, video server 241 communicates with mobile edge proxy 242 via a network (e.g. Internet 240); video server 241 generally is physically remote from mobile edge proxy 242. Mobile edge proxy 242 communicates directly with client device 245 to deliver video content requested by the client device.

It will be appreciated that the end-to-end path for video content (client device to video server) comprises two parts: (i) a path between the video server and the system executing the proxy at the cloud edge, and (ii) a path between the proxy and the client device. These two parts of the end-to-end path may have different networking characteristics.

In this embodiment, the mobile edge proxy has access to caches 243, 244 for storing tiles and chunks respectively. The video server transmits tiles for processing by the proxy and storage in tile-level cache 243. As described in detail below, the proxy generates a chunk for delivery to the client device and stores the chunk in chunk-level cache 244.

Figure 2F:
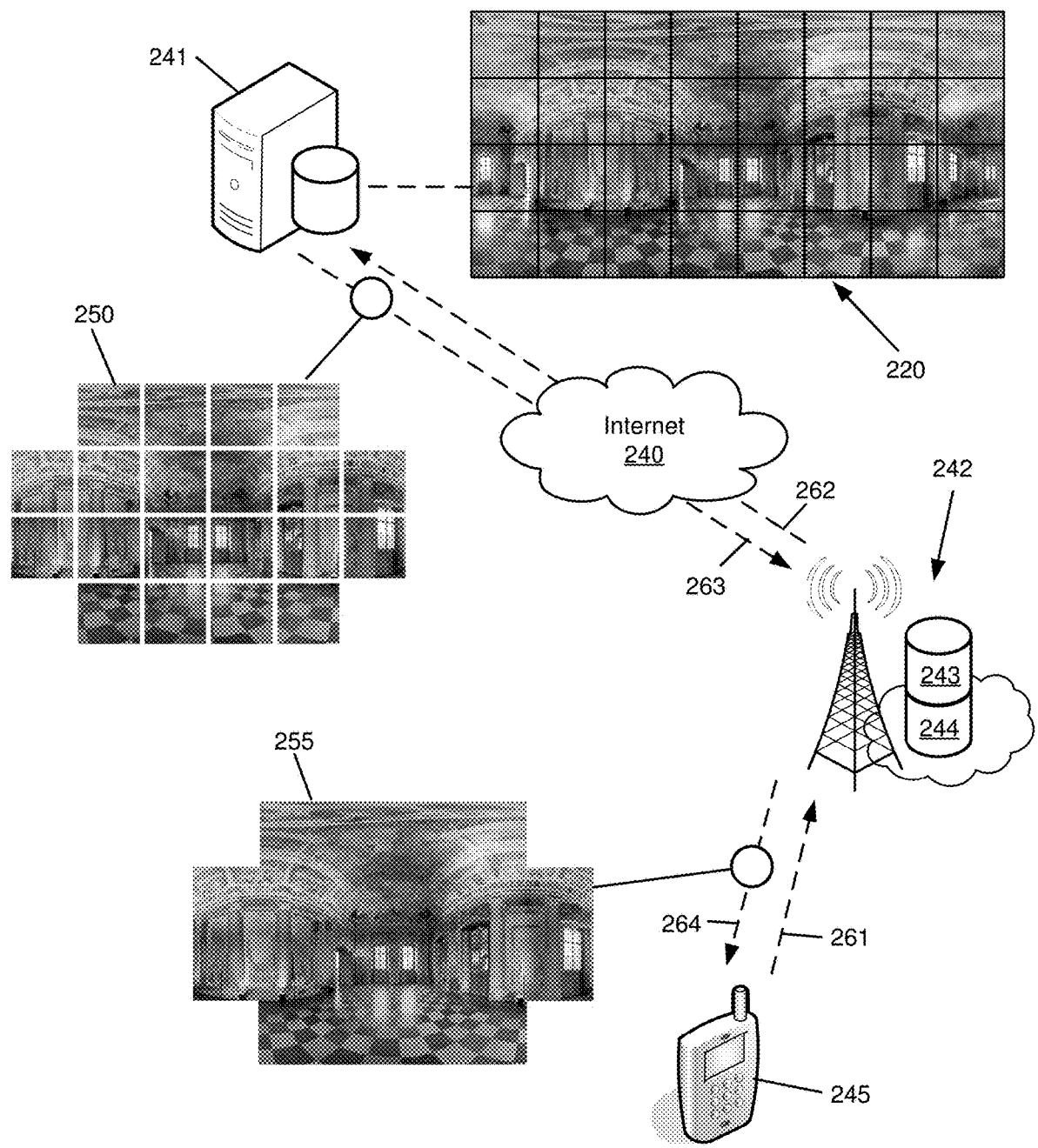
FIG. 2F schematically illustrates video tiles provided to the proxy in the system of FIG. 2E and a video chunk delivered to the client device, in accordance with various aspects described herein.

FIG. 2F schematically illustrates a non-limiting embodiment of a procedure 206 for tile-based video streaming using system 205. Client device 245 sends a request 261 for video content to the mobile edge cloud; in this embodiment, the client device also sends historical data regarding movement of the FoV (for example, the user's head movement data when using a VR headset). In a further embodiment, the client device also sends buffer occupancy data.

The proxy 242 at the mobile edge cloud uses the FoV movement data to predict the future viewport (that is, which tiles should be fetched at the highest quality level). In an embodiment, the proxy runs a machine learning algorithm based on the historical movement data. In another embodiment, the user 210 belongs to a group of users who are experiencing similar video content; the proxy can then obtain FoV movement data from other users in the group to determine the future viewport; accordingly, in this instance the historical movement data is crowdsourced.

If the predicted viewport has already been cached locally (either at the tile level or the chunk level), the proxy can send the requested content directly to the client device. Otherwise, the proxy sends to video server 241 a request 262 for a download of video tiles overlapping with the predicted viewport.

To fulfill request 262, video server 241 extracts tiles 250 from chunk 220 and sends a response 263 containing those tiles to the proxy 242.

The proxy 242 then decodes tiles 250 and combines them to reconstruct the viewport. In an embodiment, the proxy uses GPU (graphics processing unit) accelerated decoders to decode the tiles. The combined set of tiles may be considered a single-tile video chunk 255 corresponding to the predicted viewport. Proxy 242 then sends a message 264 delivering video chunk 255 to the client device. Video chunk 255 can also be stored in cache 244.

Figure 2G:
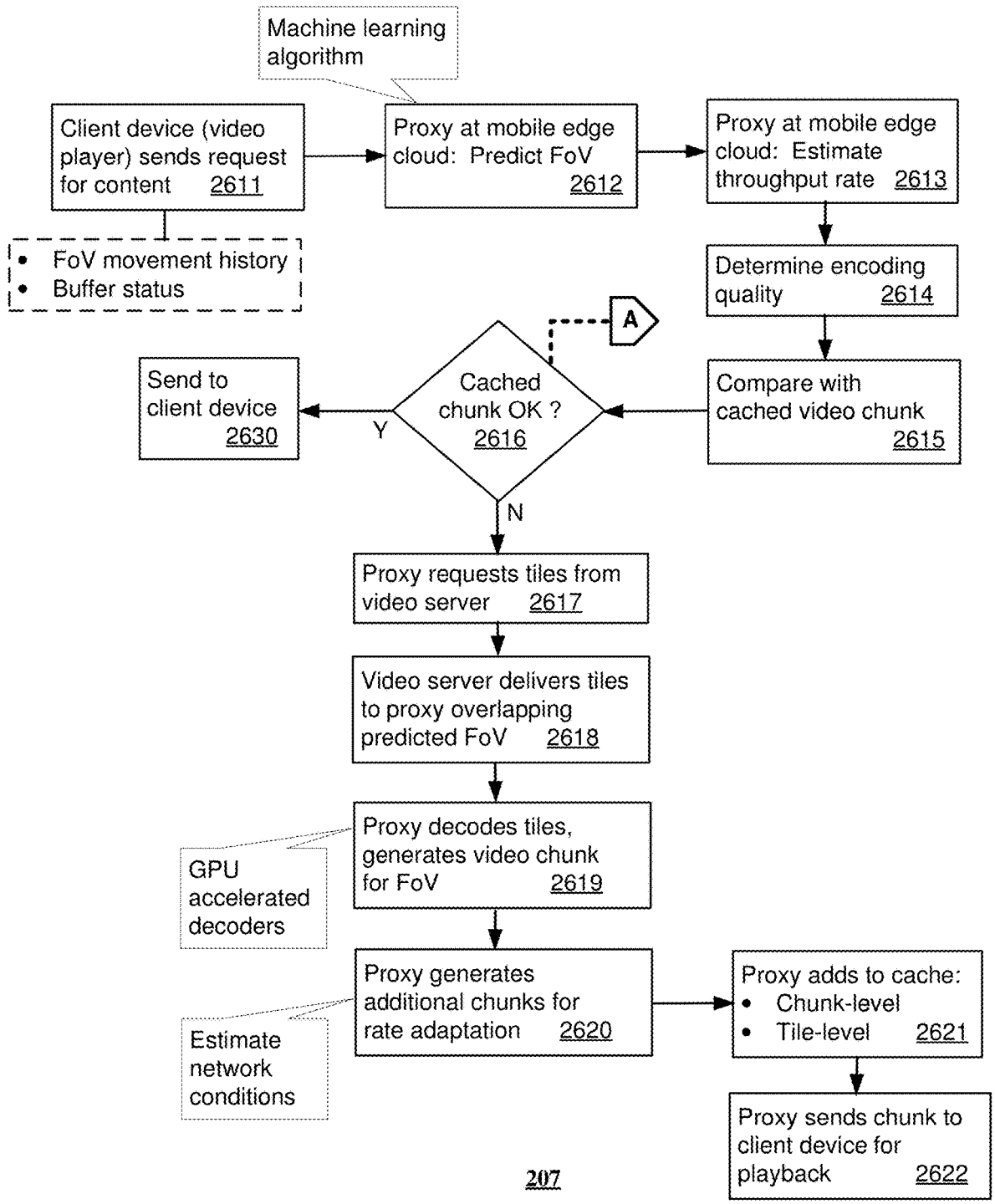
FIGS. 2G-2H are flowcharts depicting illustrative embodiments of methods in accordance with various aspects described herein.

FIG. 2G is a flowchart depicting an illustrative embodiment of a method 207 in accordance with various aspects described herein. In step 2611, a client device (e.g. a video player for playback of video content) sends a request for content to a mobile edge proxy. The request advantageously includes historical FoV movement traces and the current buffer occupancy of the client device. The proxy predicts the FoV based on the historical movement data (step 2612); in an embodiment, the proxy runs a machine learning algorithm to perform this prediction.

The proxy also estimates the data throughput rate between itself and the client device (step 2613); this permits the proxy to determine the video encoding bitrate for the requested content (which in turn permits the proxy to select the encoding quality level of the tiles to be delivered to the client device) in step 2614.

The proxy then evaluates the request, including the FoV prediction and the encoding quality, in comparison to video chunks available in the cache 244 (step 2615). If a suitable chunk is available in the cache (step 2616), that chunk is sent directly to the client device (step 2630). Details of the evaluation procedure for the cached chunk in this embodiment appear in the flowchart shown in FIG. 2H.

If a cached chunk does not sufficiently overlap with the predicted viewport and/or does not have an appropriate quality, new tiles are downloaded from the video server. In step 2617, the proxy sends a request to the video server for video tiles overlapping the predicted viewport. The video server sends the requested video tiles to the proxy (step 2618).

The proxy decodes the tiles received from the server (step 2619), and combines them to reconstruct a video chunk for the predicted viewport. In this embodiment, the decoding is performed using GPU accelerated decoders. In general, a video chunk extends temporally over multiple frames; to generate a suitable chunk, the proxy predicts the viewport for each frame in the chunk. For example, for a chunk having a duration of 1 second in video content having 30 frames per second, the proxy predicts 30 future viewports synchronized with each respective frame. For each frame, the proxy decodes tiles overlapping with the predicted viewport at the highest possible video encoding bitrate. In this embodiment, tiles not overlapping with the predicted viewport have the lowest video encoding bitrate.

In this embodiment, the proxy also estimates network conditions that may affect transport of the video content to the client device, and generates additional chunks to adapt to changes in the throughput rate (step 2620). The buffer occupancy at the mobile device can determine a time limit for downloading, chunk regeneration and delivery to the client device.

The proxy stores the downloaded tiles in the tile-level cache and the reconstructed chunk in the chunk-level cache (step 2621). The proxy then sends the chunk to the client device (step 2622) for local decoding, and finally rendering by the video player at the client device.

Figure 2H:
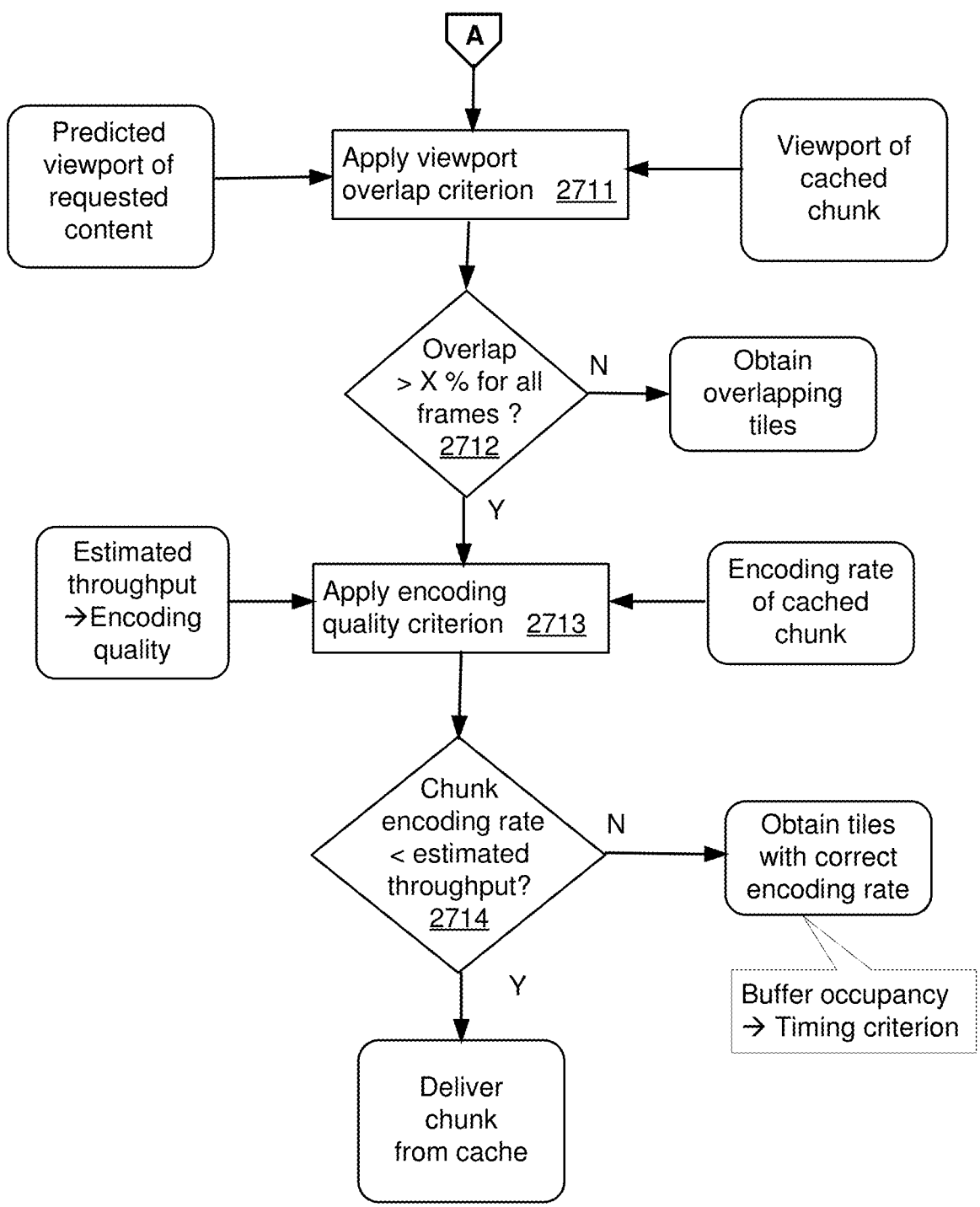

FIG. 2H is a flowchart depicting an illustrative embodiment of a method 208 for evaluating a cached chunk, in accordance with various aspects described herein. The predicted viewport of the requested content is compared with the viewport corresponding to the cached chunk by applying an overlap criterion (step 2711). If the viewport of the requested video chunk overlaps with the viewport of the cached chunk for more than a predetermined fraction of the area in all frames of the requested video chunk (step 2712), the cached chunk viewport is suitable for delivery to the client device. In this case, a corresponding panoramic video chunk with the lowest encoding quality will also be delivered to the client to cover any non-overlapping area.

In this embodiment, the cached chunk is also evaluated by applying an encoding quality criterion (step 2713). The proxy determines the video encoding quality based on the estimated data throughput rate between itself and the client device. For example, if the estimated throughput is 2 Mbps, the video encoding rate for the chunk to be delivered to the client device should be lower than 2 Mbps. If this criterion is met (step 2714), the cached chunk is suitable for delivery to the client device.

If the cached chunk does not have the same (or substantially the same) quality as requested by the proxy, new video tiles are obtained by downloading from the video server. In this embodiment, the buffer occupancy at the client device determines a timing budget: The sum of the time required for (i) downloading the new video tiles from the server, (ii) generating a video chunk by decoding and merging the downloaded video tiles, (iii) delivering the video chunk to the client device, and (iv) local decoding and rendering of the video chunk at the client device should not exceed the timing budget. For example, if the client device has 2 seconds available in its video player buffer, the timing budget for the downloading, generating, delivering, local decoding and rendering is 2 seconds.

While for purposes of simplicity of explanation, the respective processes are shown and described as a series of blocks in FIGS. 2G-2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It will be appreciated that in various embodiments, computation for decoding and merging video tiles is adaptively offloaded from the client device to the proxy. Furthermore, in order to predict future FoVs, the proxy can use machine learning algorithms that might not be feasible to run on the client device. An immersive viewing experience of 360-degree video can thus be delivered to a wide variety of client devices having limited computational power.

Figure 3:
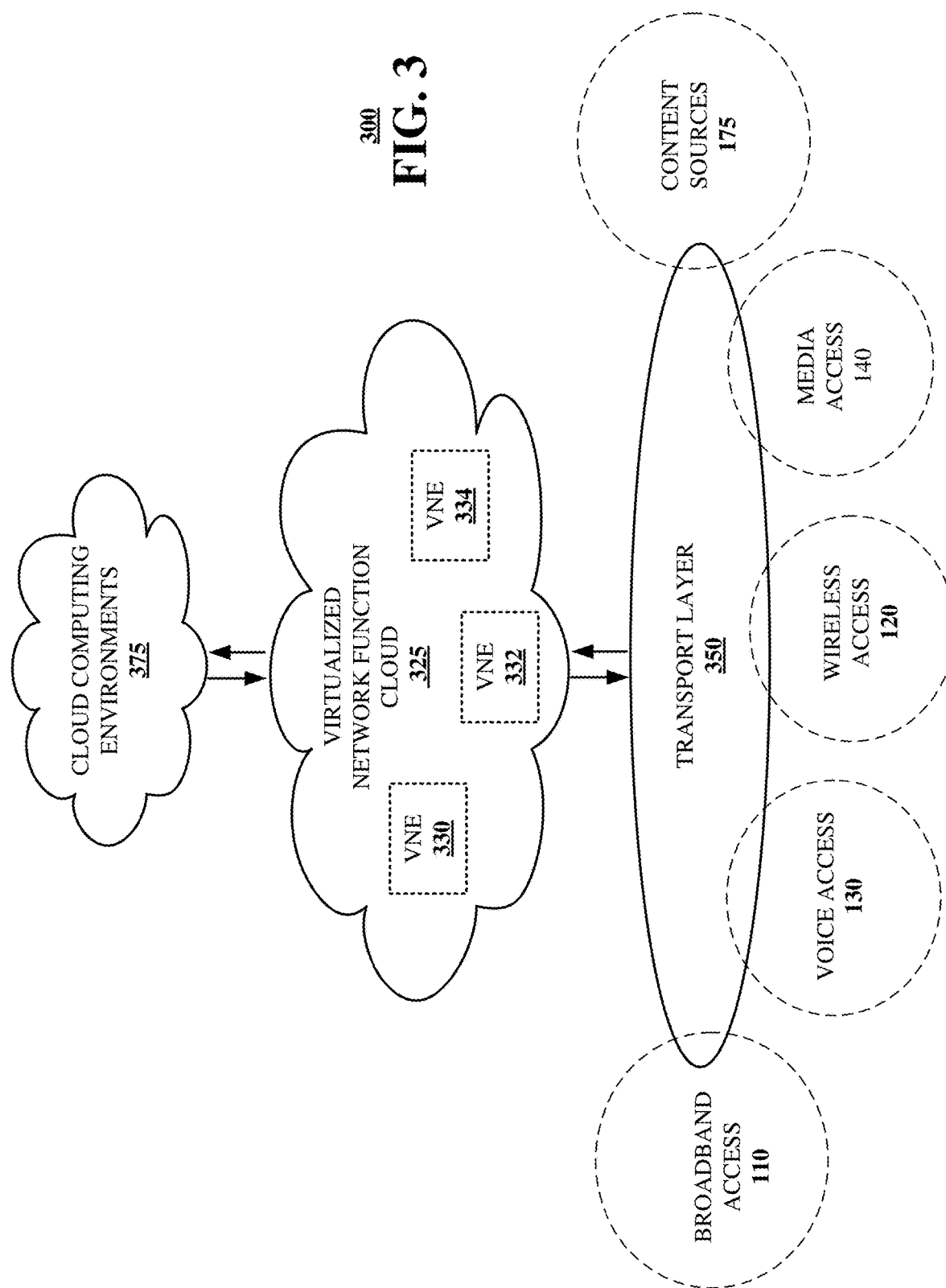
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 205, and methods 207-208 presented in FIGS. 1, 2G, and 2H. For example, virtualized communication network 300 can facilitate in whole or in part communication, by a proxy executing at a mobile edge cloud, with a video server and a client device to provide an immersive video presentation at the client device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs);

reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
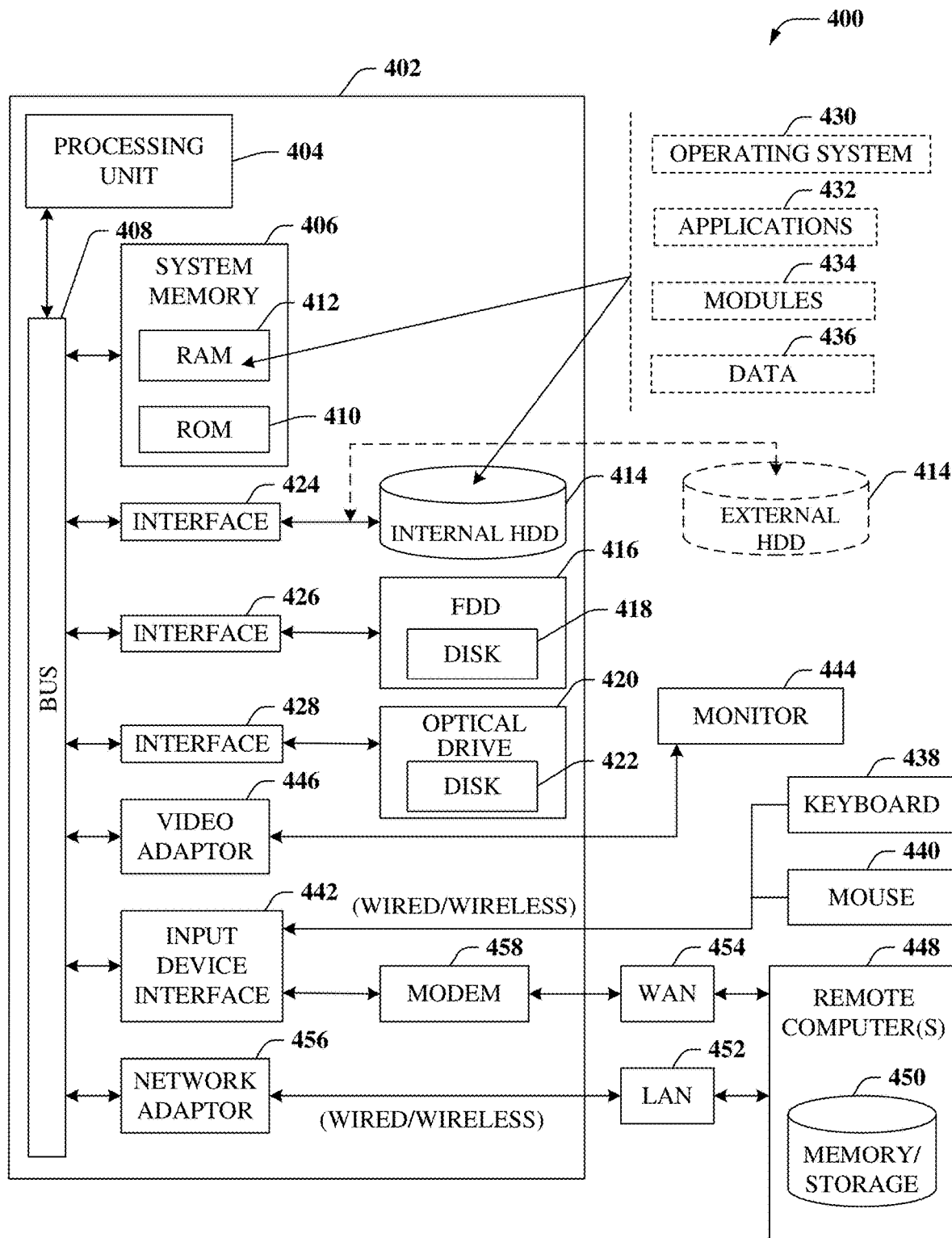
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part predicting a FoV using a machine learning algorithm; decoding and merging tiles downloaded from a video server to generate a video chunk; and delivering the video chunk to a client device.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
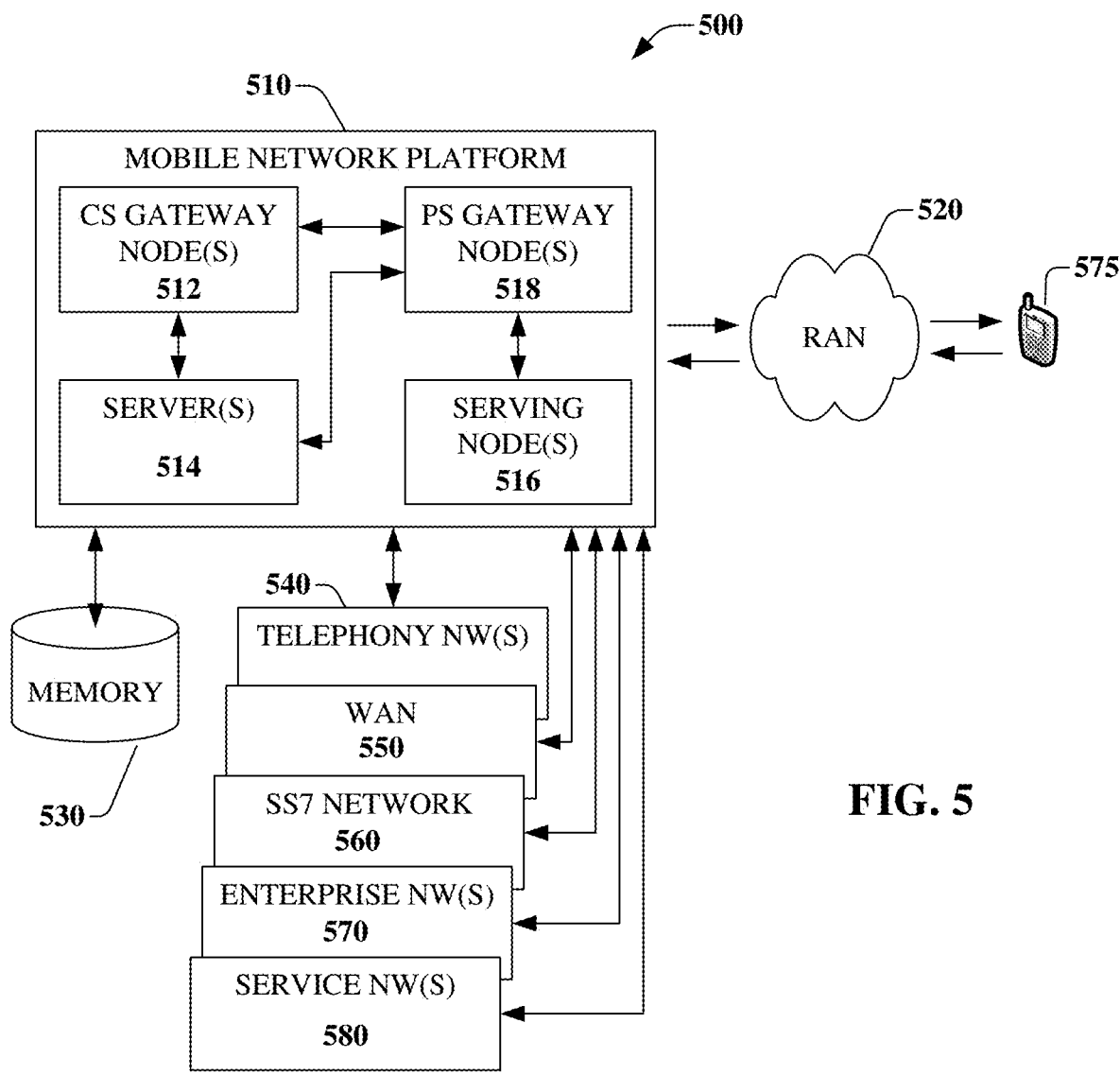
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part tile-based video streaming using a proxy executing at a mobile edge cloud, which adaptively offloads decoding and merging of video tiles from mobile devices to the mobile edge cloud. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
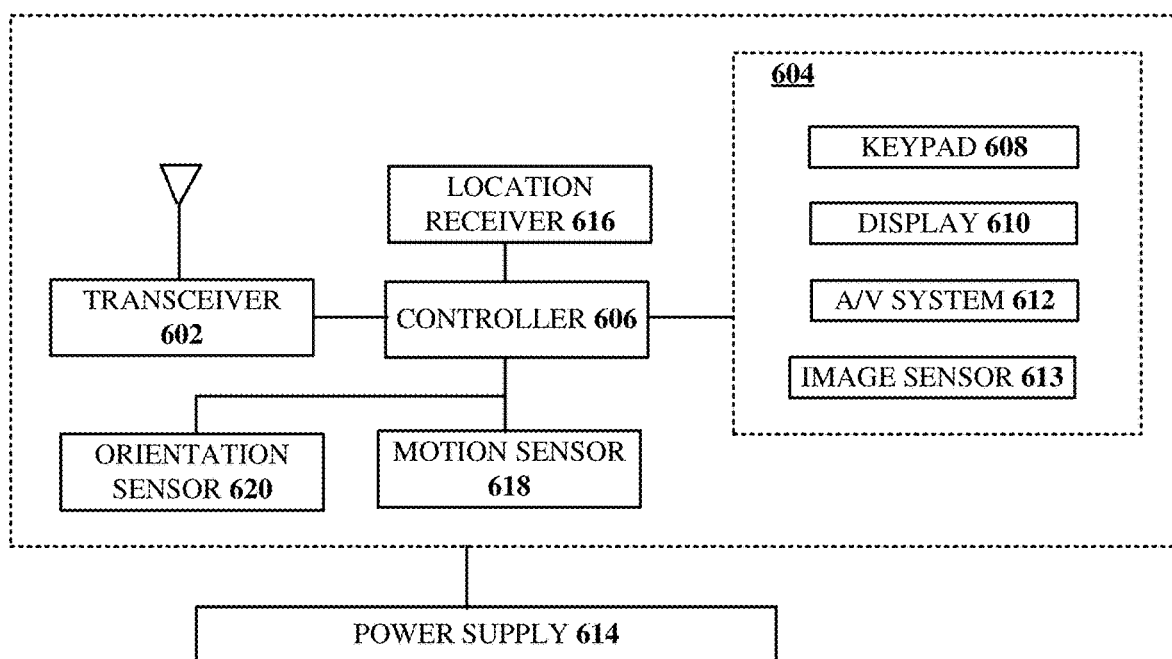
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part local decoding and rendering of a video chunk received from a proxy executing at a mobile edge cloud, thereby providing an immersive video experience to a user of the communication device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is clamied is:

1. A method, comprising:
  receiving, by a processing system including a processor, a request from a client device for video content comprising a panoramic video presentation, the processing system comprising a proxy executing at a cloud edge, the video presentation including a plurality of chunks corresponding to spatial subdivisions of the video presentation, each chunk of the plurality of chunks comprising a plurality of tiles corresponding to spatial subdivisions of the chunk;
  predicting, by the processing system, a field of view (FoV) corresponding to the request;
  estimating, by the processing system, a throughput rate for data transmission between the processing system and the client device;
  determining, by the processing system, whether a stored chunk accessible to the processing system meets criteria based on the predicted FoV and the estimated throughput rate;
  responsive to the stored chunk meeting the criteria:
    transmitting, by the processing system, the stored chunk to the client device;
  responsive to the stored chunk not meeting the criteria:
    requesting, by the processing system, a plurality of tiles from a video server;
    downloading, by the processing system, the plurality of tiles from the video server;
    generating, by the processing system, a video chunk by decoding and merging the plurality of tiles, wherein the decoding is performed using a graphics processing unit (GPU) accelerated decoder; and
    delivering, by the processing system, the generated video chunk to the client device, wherein the client device performs local decoding and rendering of the generated video chunk,
  wherein a total time required for the downloading, generating, delivering, local decoding and rendering meets a timing budget.

2. The method of claim 1, wherein the criteria comprise an overlap criterion with respect to the predicted FoV and an encoding quality criterion based on the estimated throughput rate.

3. The method of claim 1, wherein the timing budget is determined by an occupancy level of a buffer of the client device.

4. The method of claim 3, wherein the occupancy level of the buffer is included in the request.

5. The method of claim 1, further comprising:
  storing, by the processing system, the generated video chunk in a first memory; and
  storing, by the processing system, the plurality of tiles in a second memory.

6. The method of claim 5, wherein at least one of the first memory and the second memory comprises a cache memory.

7. The method of claim 1, wherein the video presentation is provided to a plurality of client devices, and wherein the FoV is predicted based on aggregating FoV information from the plurality of client devices.

8. The method of claim 1, wherein an encoding bit rate of each of the plurality of tiles is less than the estimated throughput rate.

9. The method of claim 1, wherein the processing system and the video server communicate via a first network, and wherein the processing system and the client device communicate via a second network different from the first network.

10. The method of claim 9, wherein the client device comprises a mobile device, and wherein the second network comprises a cellular network.

11. The method of claim 1, wherein the predicting is performed using a machine learning algorithm.

12. A device comprising:
a processing system including a processor, the processing system comprising a proxy executing at a cloud edge; and
a memory that stores executable instructions that, when executed by the processing system, facilitate performance of operations comprising:
receiving a request from a client device for video content comprising a panoramic video presentation, the video presentation including a plurality of chunks corresponding to spatial subdivisions of the video presentation, each chunk of the plurality of chunks comprising a plurality of tiles corresponding to spatial subdivisions of the chunk;
predicting a field of view (FoV) corresponding to the request;
estimating a throughput rate for data transmission between the processing system and the client device;
determining whether a stored chunk accessible to the processing system meets criteria based on the predicted FoV and the estimated throughput rate;
responsive to the stored chunk meeting the criteria, transmitting the stored chunk to the client device; and
responsive to the stored chunk not meeting the criteria:
requesting a plurality of tiles from a video server,
downloading the plurality of tiles from the video server,
generating a video chunk by decoding and merging the plurality of tiles, the decoding performed using a graphics processing unit (GPU) accelerated decoder, and
delivering the generated video chunk to the client device.

13. The device of claim 12, wherein the criteria comprise an overlap criterion with respect to the predicted FoV and an encoding quality criterion based on the estimated throughput rate.

14. The device of claim 12, wherein the client device performs local decoding and rendering of the generated video chunk, and wherein a total time required for the downloading, generating, delivering, local decoding and rendering is less than a time budget determined by an occupancy level of a buffer of the client device.

15. The device of claim 12, wherein the video presentation is provided to a plurality of client devices, and wherein the FoV is predicted based on aggregating FoV information from the plurality of client devices.

16. The device of claim 12, wherein the processing system and the video server communicate via a first network, and wherein the processing system and the client device communicate via a second network different from the first network.

17. A non-transitory machine-readable medium comprising executable instructions that, when executed by a processing system including a processor and comprising a proxy executing at a cloud edge, facilitate performance of operations comprising:
receiving a request from a client device for video content comprising a panoramic video presentation, the video presentation including a plurality of chunks corresponding to spatial subdivisions of the video presentation, each chunk of the plurality of chunks comprising a plurality of tiles corresponding to spatial subdivisions of the chunk;
predicting a field of view (FoV) corresponding to the request, wherein the predicting is performed using a machine learning algorithm;
estimating a throughput rate for data transmission between the processing system and the client device;
determining whether a stored chunk accessible to the processing system meets criteria for presenting the video content;
responsive to the stored chunk meeting the criteria, transmitting the stored chunk to the client device; and
responsive to the stored chunk not meeting the criteria:
downloading a plurality of tiles from the video server,
generating a video chunk by decoding and merging the plurality of tiles, the decoding performed using a graphics processing unit (GPU) accelerated decoder, and delivering the generated video chunk to the client device.

18. The non-transitory machine-readable medium of claim 17, wherein the criteria comprise an overlap criterion with respect to the predicted FoV and an encoding quality criterion based on the estimated throughput rate.

19. The non-transitory machine-readable medium of claim 17, wherein the client device performs local decoding and rendering of the generated video chunk, and wherein a total time required for the downloading, generating, delivering, local decoding and rendering is less than a time budget determined by an occupancy level of a buffer of the client device.

20. The non-transitory machine-readable medium of claim 17, wherein the FoV is predicted based on aggregating FoV information from a plurality of client devices.

* * * * *